Sept. 2, 1947.    R. C. SANDERS, JR    2,426,901
FREQUENCY MODULATED RADIO LOCATOR SYSTEM AND INDICATOR
Filed July 26, 1943    3 Sheets-Sheet 1
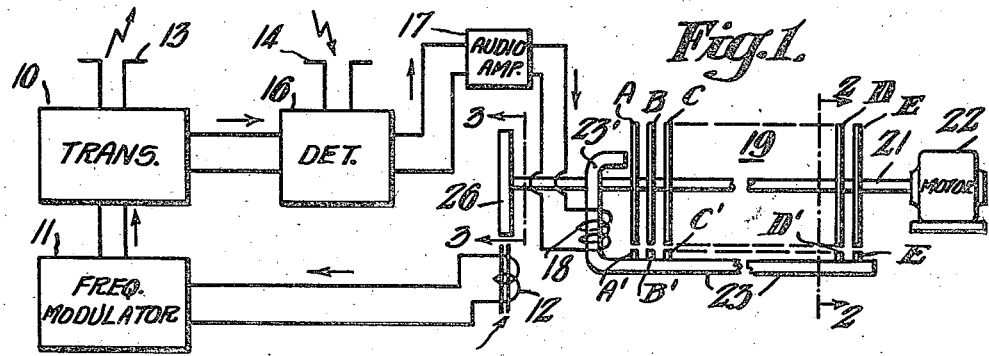
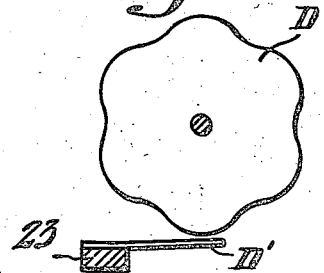
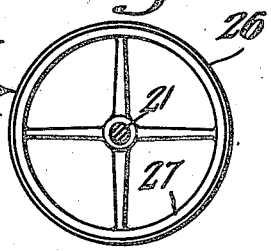
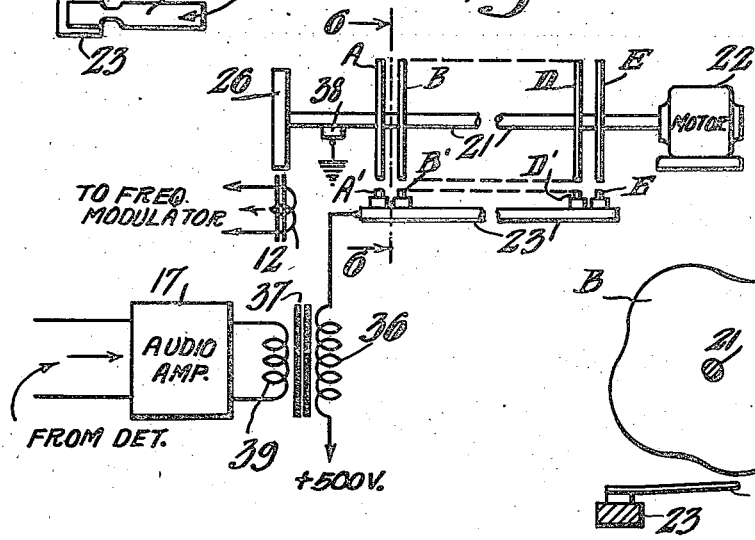
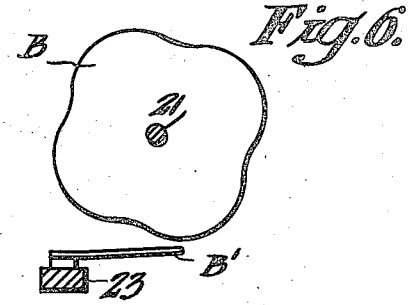
Inventor
Royden C. Sanders, Jr.
By
Attorney

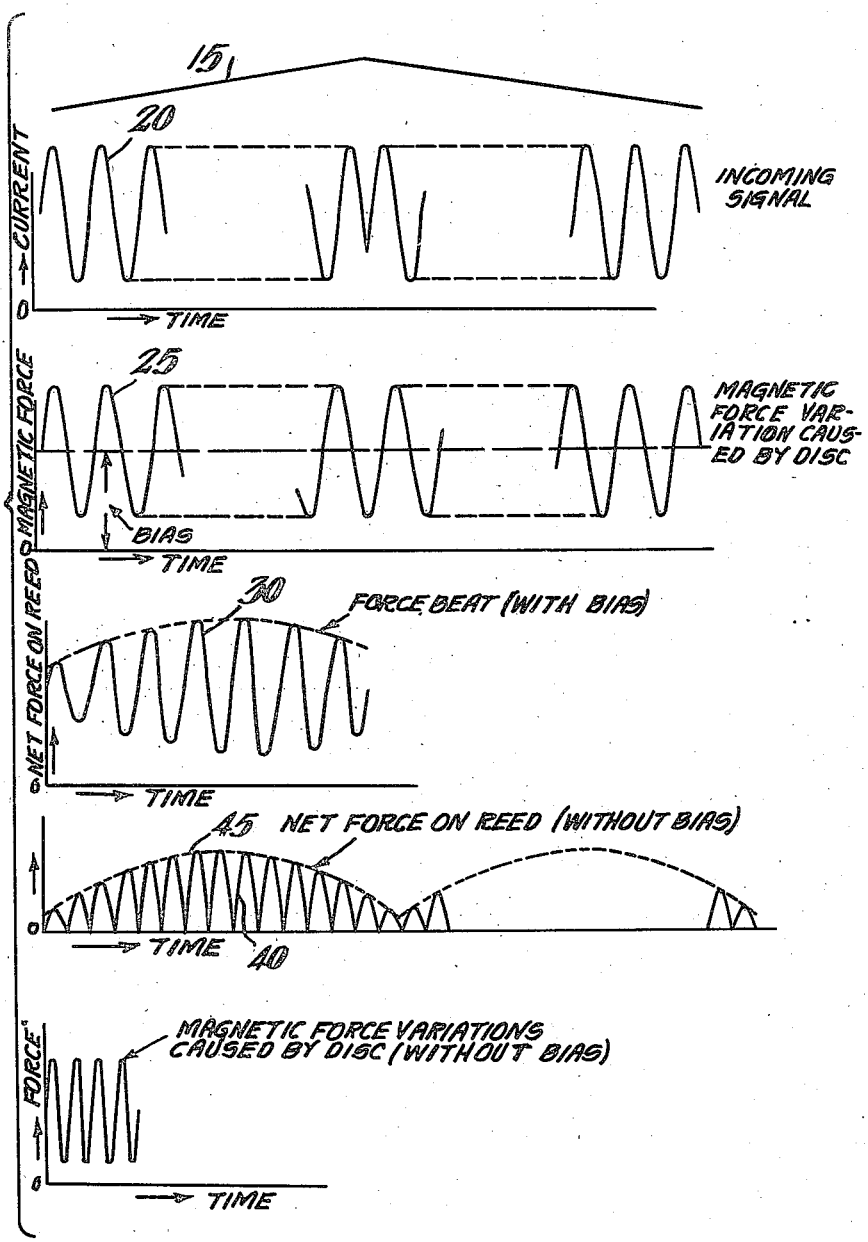

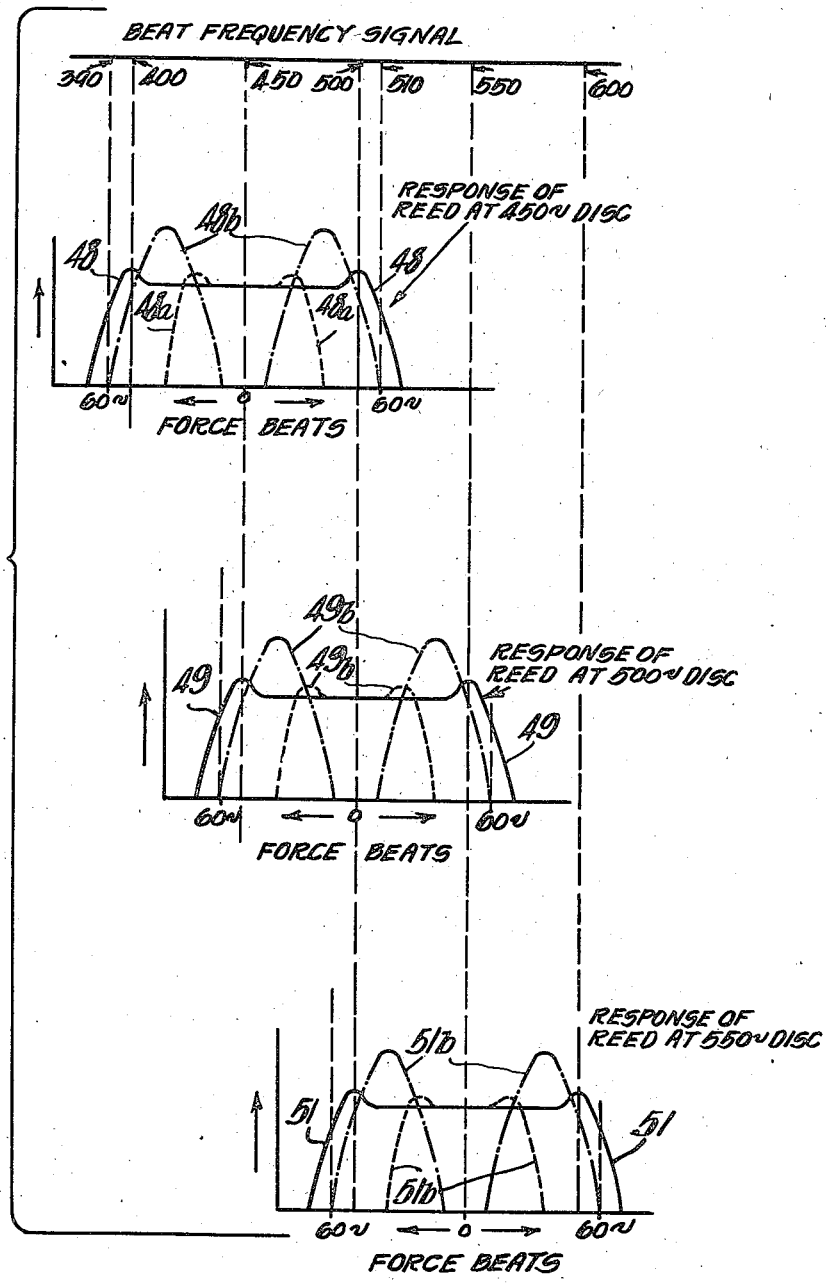

Patented Sept. 2, 1947

2,426,901

UNITED STATES PATENT OFFICE 2,426,901

FREQUENCY MODULATED RADIO LOCATOR SYSTEM AND INDICATOR

Royden C. Sanders, Jr., Hightstown, N. J., assignor to Radio Corporation of America, a corporation of Delaware Application July 26, 1943, Serial No. 496,246

3 Claims. (Cl. 250—1.68)

My invention relates to object locating and distance measuring systems of the type utilizing the transmission and reflection of radio waves or of other suitable waves. The invention relates particularly to multiple frequency indicators and to their use in an object locating system of the frequency-modulated type whereby simultaneous indications of a plurality of reflecting objects may be obtained.

Distance measuring systems of the frequency-modulated type are described in Bentley Patent 2,011,392 and in Espenschied Patent 2,045,071. In these systems, the radiated frequency-modulated wave is reflected from the earth's surface or from an aircraft or other object to be located and the reflected wave is received by means including a heterodyne receiver located in the vicinity of the transmitter. The heterodyning or mixing signal for the receiver is obtained directly from the transmitter whereby the receiver output includes a signal of "beat frequency" which frequency is a function of the time required for the radiated signal to reach the reflecting object and return to the receiver.

An object of the present invention is to provide an improved object locating and/or distance measuring system for indicating a plurality of reflecting objects.

Another object of the invention is to provide an improved multiple object or target indicator for object locator systems of the cyclic frequency-modulated type.

A further object of the invention is to provide an improved frequency analyzer.

A still further object of the invention is to provide an improved multiple target indicator or frequency analyzer of the vibrating reed type.

In practicing one preferred embodiment of the invention, the multiple frequency indicator comprises a plurality of indicating reeds all of which are tuned to respond to driving forces of the same frequency or narrow band of frequencies. For example, each reed may be deflected or vibrated by any applied force, such as a magnetic field or an electric field, that varies in intensity at a rate of from 0 to 60 cycles per second. Adjacent to each reed there is located the periphery of a rotatable disc which has a sine wave curve on the periphery for varying the magnetic or electrostatic pull between the disc and the reed. A large number of reeds and discs may be provided, the number depending upon the frequency range to be covered and the accuracy desired. Each disc has a different number of sine waves cut on the periphery. For instance, assuming the use of magnetic bias as described hereinafter, if there are 99 discs (and 99 reeds), the first disc may have two sine waves cut on it, the second disc three sine waves, etc., the last disc having 100 sine waves cut on it. Thus, if rotated at the rate of 50 rotations per second, the group of discs will produce magnetic force pulsations at the reeds number 1 to 99 having pulsation rates or frequencies from 100 to 5000 per second, respectively.

Assuming that the indicator is employed in a frequency-modulated distance measuring system, the visual frequency indications are obtained by applying the beat-frequency output signal of the detector (after suitable amplification) to the indicator in such a way as to vary the field between the several discs and their associated reeds. This detector output signal may include frequencies from 0–5000 per second, for example. These signal pulsations beat with the pulsations caused by the sine wave configuration of the discs whereby the field pulsations at one particular reed will fall within the response range of the reeds, assumed to be from 0 to 60 cycles, and this reed will vibrate or deflect. Since the field pulsations at this one reed have been produced by a particular beat-frequency signal in the detector output, the reed vibration indicates the presence of this particular beat-frequency signal and, therefore, the presence of a reflecting object a corresponding distance away.

The invention will be better understood from the following description taken in connection with the accompanying drawing in which Figure 1 is a diagram of a frequency-modulated radio locator system which includes a multiple target indicator constructed in accordance with one embodiment of the invention, Figure 2 is a view taken on the line 2—2 of Fig. 1, Figure 2a is a plan view of one of the tuned reeds used in the indicator of Fig. 1, Figure 3 is a view taken on the line 3—3 of Fig. 1, Figure 4 is a group of graphs that are referred to in explaining the invention, Figure 5 is a side view of an electrostatic type indicator embodying the invention, together with a circuit diagram of part of the associated circuit, Figure 6 is a view taken on the line 6—6 of Fig. 5, and Figure 7 is a group of graphs that are referred to in explaining the operation of the improved indicator.

In the several figures, like parts are indicated by the same reference character.

Fig. 1 shows an embodiment of the invention as applied to a frequency-modulated distance measuring system comprising a radio transmitter 10 and a frequency-modulator 11 for cyclically modulating the transmitter carrier wave in accordance with a modulating signal such as the triangular wave 15 (Fig. 4) that is supplied to the modulator from a pickup device 12. The frequency-modulated wave is radiated from an antenna 13 to the reflecting objects and the reflected signal is picked up by a receiver antenna 14 and supplied to a beat-frequency detector 16. A heterodyning signal is also supplied directly from the transmitter 10 to the detector 16 where it beats with the reflected signal to produce a beat-frequency signal in the output circuit of the detector. Such a beat-frequency signal is illustrated by the graph 20 in Fig. 4. The heterodyning signal and the signal radiated from the transmitter antenna 13 are identical.

The beat-frequency output signal from the detector 16 preferably is amplified by an audio amplifier 17 and supplied to the signal input coil 18 of a multiple-reed frequency indicator 19 that is designed in accordance with one embodiment of the invention.

Referring to Figs. 1 and 2, the indicator 19 comprises a plurality of discs A, B, C, D, E, etc., which are made of steel or other magnetic material. These discs are mounted on a shaft 21, also of magnetic material, which is rotated by a motor 22. The speed of rotation may be 50 rotations per second, for example. Each of the discs A, B, C, etc., has a sine wave configuration cut on its periphery. This is illustrated in Fig. 2 where the disc D is shown.

A plurality of tuned reeds A', B', C', etc. are mounted adjacent to the peripheries of the discs A, B, C, etc., respectively, each reed being tuned for maximum response at the same frequency or narrow band of frequencies. For instance they may be tuned for maximum response at and in the region of 25 cycles per second, the reeds being damped as indicated in Fig. 2a so that the reed response resembles that of a low pass filter. In the example assumed, each reed will respond to any frequency in the range of from 0 to 60 cycles. The reeds A', B', C', etc. are mounted on a supporting bar 23 which may be bent back on itself to provide a section 23' upon which the input coil 18 is wound. Both the indicator reeds and the bar 23 are of magnetic material so that by positioning the end of the section 23' close to the disc A there is provided a closed magnetic circuit for the coil 18.

The indicator may be operated either with or without magnetic bias. For example, the D.-C. component of the anode current in the audio amplifier 17 may flow through the coil 18 to provide a magnetic bias; or the connection to the coil 18 may include a capacitor whereby only alternating current flows therethrough.

The operation will first be considered assuming the use of magnetic bias. If there is no beat-frequency signal appearing in the detector output circuit, the only current flowing through the coil 18 will be the D.-C. component of the audio amplifier plate current. In that case, if the discs A, B, C, etc., were stationary, there would be a steady magnetic field between the discs and the associated tuned reeds and a steady magnetic pull on the reeds. When the discs are rotated, however, the magnetic force exerted on each reed varies sinusoidally as illustrated in Fig. 4 where the graph 25 represents the variations introduced by one particular disc. The rate of this variation at each reed depends upon the number of sine waves cut on the associated disc. Since these pulsations or variations in the magnetic field occur at frequencies that are higher than the frequency response range of the tuned reeds, the reeds are not deflected thereby. Such pulsations will have a range of from 100 to 5000 cycles per second, in the example assumed.

Upon the reception of waves from reflecting objects located at different distances from the transmitter, the resulting beat-frequency signals will flow through the coil 18 and produce at the tuned reeds fluctuations in the magnetic field. These fluctuations will beat with the fluctuations produced by the rotating discs and produce beat fluctuations in the magnetic field. These beat fluctuations are magnetic force beats that deflect or vibrate the reeds. The graph 30 of Fig. 4 illustrates such a beat fluctuation produced by the signal 20 and by the disc that caused the field variation represented by the graph 25. Since the beat-frequency signals from the detector 16 lie within the range of from 0 to 5000 cycles per second in the example assumed, there will be beat fluctuations in the magnetic force of the required low frequency (0 to 60 cycles) at certain indicator reeds to cause their vibration or deflection. Therefore, the deflection of a particular reed indicates the presence of a signal having a particular beat frequency and thus indicates the presence of a reflecting object a corresponding distance away.

In order to avoid any error in the frequency indication due to variations in the speed of the motor 22, it is desirable to maintain synchronism between the motor speed and the frequency-modulating signal. This may be done conveniently by permanently recording the modulating signal, such as a triangular wave, on a magnetic tape 26. The tape 26 may be carried by a non-magnetic wheel 27 (Fig. 3) that is keyed or otherwise fastened to the shaft 21. The modulating signal is taken off the tape 26 by the pickup unit 12 and supplied to the modulator 11.

With this arrangement, any variation in motor speed will change the frequency modulation rate $f_m$ and cause a change in the frequency $f_r$ of the received signal reflected from a target a given distance away. This is shown by the equation $$f_r = \frac{(f_m)(D)(B)}{246}$$

where D is the distance to the target in feet and B is the band width of the frequency modulation in megacycles, the frequencies $f_r$ and $f_m$ being in cycles per second. Therefore, while any motor speed increase, for example, will increase the rate of the magnetic field pulsations caused by the discs A, B, etc., it will cause a like increase in the frequency of the field pulsations produced by the signal from a given target and the beat frequency of these two pulsations will remain unchanged.

In practicing the invention, the indicator may be operated either with a bias of magnetic flux as assumed in the foregoing description, or with no bias, i. e., with no "D.-C." component in the flux. In either case the beat-frequency discontinuity at the end of a frequency modulation sweep, at times, may be such that the beats produced during one sweep oppose the tuned reed vibrations that have been set up by a preceding sweep. This might result in poor indication for a particular target if such discontinuity remained the same for each successive sweep. However, this would be the case only if the reflection were from a strictly stationary target.

The more usual situation will be where the indicator is used to locate moving objects such as surface ships or aircraft. In that case, the beat-frequency discontinuity will be different at the end of each successive frequency-modulation sweep and no discontinuity of the type causing poor indication will last long enough to cause failure of tuned reed response for any target.

There will be only one beat cycle or less during each frequency modulation sweep for actuating the reeds in the apparatus described where the reeds respond to frequencies from 0 to 60 cycles per second and where the frequency modulation is at the rate of 50 per second. If the tuned reeds have maximum response in the region of 25 cycles per second, then the received signal that will give maximum reed response will produce only about a half cycle of magnetic force to actuate the reed, i. e., there will be only this fractional cycle before the next discontinuity occurs in the beat frequency. This is not objectionable because the reeds can be swung to full amplitude of deflection in a half cycle or less.

There are certain differences in the design and operation of an indicator having magnetic bias and one having no magnetic bias which are noted below.

*With magnetic bias*

In this case the frequency of the magnetic force (the magnetic force beat) that vibrates a reed is equal to the signal frequency minus the sine wave disc frequency.

As to the effect of a beat frequency discontinuity, any discontinuity tends to impair the tuned reed response somewhat.

*Without magnetic bias*

In this case the frequency of the magnetic force (magnetic force beat) that vibrates a reed is equal to twice the signal frequency minus the sine wave disc frequency. This means that the number of sine waves cut on each disc should be twice the number of sine waves cut thereon for use with magnetic bias. Thus a varying force such as shown by the graph 40 in Fig. 4 beats with the varying force caused by the signal 20, for example, to produce the beat force represented by the graph 45.

The effect of a beat-frequency discontinuity differs from the case where bias is used in that a 180° phase change has no effect. Any other discontinuity, however, impairs the reed response somewhat.

Figs. 5 and 6 show an embodiment of the invention that differs from that of Fig. 1 in that a varying electric force instead of a magnetic force is utilized for driving the indicator reeds A', B', etc. In this design the discs A, B, etc., and the other parts which should be of magnetic material in the design of Fig. 1 need only be of conducting material so that a suitable voltage difference may exist between a disc and its associated reed. A D.-C. voltage such as 500 volts may be applied to the indicator reeds through the secondary 36 of a transformer 37 while the discs A, B, etc., are held at ground potential by connecting the shaft 21 to ground through a brush 38.

The detector output or beat-frequency signal is supplied to the primary winding 39 of the transformer 37 whereby the beat-frequency signal voltage varies the electric field between the reeds A', B', etc., and the discs A, B, etc. These variations in the electric field beat with the variations in the field caused by the rotating discs whereby the tuned reed opposite a particular disc will be vibrated by a particular beat-frequency signal just as described in connection with Fig. 1.

In the case where an electric field is used, the previous comments regarding the use of bias or no bias apply. In Fig. 5 there is illustrated the use of an electric field bias which is provided by the +500 volts, the output of amplifier 17 never being sufficient to reduce the electric field at the reeds to zero. If the indicator of Fig. 5 is to be operated with no bias, the lower end of coil 36 is grounded and the number of sine waves on the discs are doubled.

The response of the indicator reeds to different beat-frequency signals is illustrated in Fig. 7 for the particular design constants that have been assumed and for the case where there is either a magnetic bias or an electric field bias. The graph 48 shows that the reed opposite the 450 cycle disc (9 sine waves on disc) will respond to applied beat-frequency signals over the comparatively narrow frequency range from 390 cycles per second to 510 cycles per second. If the beat frequency of the applied signal is 450 cycles, there will be a zero force beat and the reed will be deflected away from its center position. If the beat frequency of the applied signal is either 425 cycles or 475 cycles, for example, the force beat will be a 25 cycle beat and the reed will vibrate with the same response in both cases.

It will be noted from a comparison of the graphs 48, 49 and 51 that the response ranges of adjacent reeds are made to overlap. Therefore, while the reed opposite the 450 cycle disc responds alike to applied beat-frequency signals of frequencies above or below 450 cycles, it is only the frequencies above 450 cycles that will cause the reed opposite the 500 cycle disc to respond also.

It may be preferred to have little, if any, overlap in the response of adjacent reeds. This condition is illustrated by the broken line response curves 48a, 49a and 51a, representing a case where the upper response limit of each reed is about 30 cycles per second.

Also, if preferred, the indicator reeds may be tuned comparatively sharply to have a response such as shown by the graphs 48b, 49b and 51b. It will be noted that the response ranges for adjacent reeds overlap so that there is no "dead spot" in the frequency response of the indicator.

I claim as my invention:

1. A radio locator system comprising means for cyclically frequency modulating a radio wave and for transmitting it to a reflecting object, a detector, means for applying to said detector both the reffected wave and the frequency-modulated wave direct from the transmitter to produce a beat-frequency signal, a frequency indicator comprising a plurality of rotatable discs each having its periphery cut in the configuration of a sine wave and each disc having a different number of sine waves cut thereon, a plurality of similarly tuned indicator reeds positioned adjacent to the peripheries of said discs, respectively, means for establishing a force between said discs and said reeds which varies with the change in spacing therebetween as the discs are rotated, and means for further varying said force in accordance with said beat-frequency signal for producing beats in said force whereby a given frequency component in the applied signal produces beats differing in frequency at the different reeds, one of said beats having a frequency within the response range of said reeds whereby it deflects the reed that is located where said one beat occurs, said means for frequency modulating the radio wave comprising a record of the frequency-modulating wave, means for rotating said record synchronously with said discs, and a pickup device for taking signal off said record.

2. A radio locator system comprising means for cyclically frequency modulating a radio wave and for transmitting it to a reflecting object, a detector, means for applying to said detector both the reflected wave and the wave direct from the transmitter to produce a beat-frequency signal, a frequency indicator comprising a plurality of similarly tuned indicator elements, means for applying to said tuned elements an electrical force that varies in accordance with said beat-frequency signal, means for varying said electrical force at a different periodic rate at each of said tuned elements for producing beats in said force whereby a given frequency component in the applied signal produces beats differing in frequency at the different tuned elements, one of said beats having a frequency within the response range of said tuned element whereby it actuates the tuned element that is located where said one beat occurs, and means for synchronizing the frequency modulation of said radio wave with the production of said periodic variations.

3. A radio locator system comprising means for cyclically frequency modulating a radio wave and for transmitting it to a reflecting object, a detector, means for applying to said detector both the reflected wave and the wave direct from the transmitter to produce a beat-frequency signal, a frequency indicator comprising a plurality of similarly tuned indicator elements, means for applying to said tuned elements an electrical force that varies in accordance with said beat-frequency signal, means for varying said electrical force at a different periodic rate at each of said tuned elements for producing beats in said force whereby a given frequency component in the applied signal produces beats differing in frequency at the different tuned elements, one of said beats having a frequency within the response range of said tuned elements whereby it actuates the tuned element that is located where said one beat occurs, said means for frequency modulating the radio wave comprising a record of the frequency-modulating wave, and means for taking signal off said record synchronously with the production of said periodic rate variations.

ROYDEN C. SANDERS, JR.

REFERENCES CITED

The following references are of record in the file of this patent:

UNITED STATES PATENTS

| Number | Name | Date |
|---|---|---|
| 831,180 | McGarvey | Sept. 18, 1906 |
| 2,133,150 | Rich | Oct. 11, 1938 |
| 1,993,326 | Hart | Mar. 5, 1935 |
| 2,280,109 | Varela | Apr. 21, 1942 |